(12) United States Patent
Barritz et al.

(10) Patent No.: US 7,155,414 B2
(45) Date of Patent: Dec. 26, 2006

(54) LICENSE COMPLIANCE VERIFICATION SYSTEM

(75) Inventors: Robert Barritz, New York, NY (US); Steven Barritz, New York, NY (US); Per Hellberg, New York, NY (US)

(73) Assignee: International Business Machines Corporation, Armonk, NY (US)

(*) Notice: Subject to any disclaimer, the term of this patent is extended or adjusted under 35 U.S.C. 154(b) by 1067 days.

(21) Appl. No.: 09/726,166

(22) Filed: Nov. 29, 2000

(65) Prior Publication Data

US 2002/0065780 A1 May 30, 2002

Related U.S. Application Data

(60) Provisional application No. 60/194,720, filed on Apr. 5, 2000.

(51) Int. Cl.
*G06F 16/24* (2006.01)
*G06F 21/00* (2006.01)

(52) U.S. Cl. .................. 705/59; 705/1; 705/58; 705/80; 713/153; 713/165; 709/223

(58) Field of Classification Search .......... 705/59, 705/1, 58, 80; 713/153, 165; 709/223
See application file for complete search history.

(56) References Cited

U.S. PATENT DOCUMENTS

| | | | | |
|---|---|---|---|---|
| 5,579,222 A | * | 11/1996 | Bains et al. | 395/712 |
| 5,892,900 A | * | 4/1999 | Ginter et al. | 395/186 |
| 5,925,127 A | | 7/1999 | Ahmad | |

* cited by examiner

*Primary Examiner*—James A. Reagan
*Assistant Examiner*—John M. Winter
(74) *Attorney, Agent, or Firm*—Ostrolenk, Faber, Gerb & Soffen, LLP

(57) ABSTRACT

A license compliance verification system and method includes a license manager that internally monitors the use of licensed property and gathers data over specified time periods about the usage of the licensed property relative to a plurality of parameters including a parameter that defines the licensors of the licensed property. License compliance verification software interfaces with the license manager and extracts from its data logs licensor specific data that is subsequently forwarded to licensors. The collected data is authenticated to assure licensors that it has not been tampered with.

40 Claims, 2 Drawing Sheets

LICENSE COMPLIANCE VERIFICATION SYSTEM

RELATED APPLICATION

This Application claims priority and is entitled to the filing date of U.S. Provisional Application Ser. No. 60/194,720 filed Apr. 5, 2000, and entitled "LICENSE COMPLIANCE VERIFICATION SYSTEM."

BACKGROUND OF THE INVENTION

The present invention relates to computer software and, more particularly, to a license compliance verification system for computer software, licensed material such as copyrighted music and videos, and the like.

When computer software products are licensed to user organizations (customers), the price charged is generally based on the licensed rights conferred. Those rights might be couched in terms of how many computers the product may be executed on, or the aggregate processing power of the computers on which the product will execute, or the particular identities of the computers, or the total number of individuals who may use the product at any given time, or the particular set of named users who may use the product, and so forth.

A user organization with ten computers might license the identical software product, and receive the very same physical media containing the product, as an organization with a single computer, but might pay six or eight times as much. This is considered appropriate, since the larger organization will be deriving more use and value from the software product, and is therefore willing to pay a higher license fee. And if, after initially licensing the software for an initial number of computers (or aggregate power, or number of individuals, etc.), the organization wishes to operate the product on a greater number of computers (or aggregate power, or number of individuals, etc.), the software vendor will want to charge an "upgrade" fee to grant those additional licensed rights. And, increasingly, software licensed for use on Personal Computers is licensed and charged for based on the discrete functions that the user elects to perform, and/or the number of such operations performed (or permitted) within a given time period, such as a month, with extra charges being due if more functions are used or monthly limits exceeded.

It is therefore very important to vendors to try to ensure that licensees of their products do not use them beyond the rights that the licensees have paid for.

Many vendors control the use of their licensed software products via some type of Execution Control Mechanism (ECM). This might take the form of a License Manager (LM). LMs being presently marketed include FLEXlm from Globetrotter, LicensePower/iFOR from Isogon, LUM from IBM, and Sentinel/LM from Rainbow. Alternatively, a software vendor might develop his own vendor-specific ECM, for use only with that vendor's licensed products.

While the above LMs are proprietary, the XSLM standard for LMs was approved in March of 1999 by The OpenGroup (TOG). The standard is expected to encourage the development of XSLM-compliant LMs (XSLM-LMs) from several LM vendors. In particular, Isogon Corporation and IBM are jointly developing an XSLM-LM that will be marketed by the parties under their respective brands.

Licensees of a software product controlled by a particular ECM are obliged to install and operate that ECM on the licensee's computer system or network. (Many vendor-specific ECMs are embedded in the licensed products they control, and do not have to be executed separately.) The ECM accepts passwords or license certificates, supplied by the vendor of the licensed software, that describe the extent of the licensed rights, such as the computers the software may run on (as defined by their serial numbers), the number of concurrent users, the identity of particular authorized users, etc. Typically, when a licensed software product begins its execution, it invokes the ECM, perhaps using an Application Programming Interface (API) defined for this purpose by the vendor of the LM, and supplying identification information including the name of the software product. The ECM determines if there exists a license certificate corresponding to the software product in question, and, if so, whether the licensed rights detailed in the certificate match the circumstances of use. If they do, a "clear-to-proceed" response is returned to the licensed software product. But if they do not—if, for example, the licensed software product is currently executing on a computer whose serial number is not defined in the certificate—the ECM returns an "out-of-compliance" response to the licensed software product, which can take whatever action the vendor of that product has deemed appropriate under that circumstance.

Software vendors who instrument their products to use the services of an ECM can elect to have those products, if they should receive an "out-of-compliance" (OOC) response from the ECM, simply refuse to process further, terminating, perhaps with an explanatory message. (This is known as a "hard stop".) In this way, vendors are fully protected against misuse of their products.

However, end-user licensees generally regard hard-stops as extremely harsh and unyielding, possibly even constituting unlawful repossession of the software. They take the view that there may be a valid justification for going beyond the rights conferred by the software license. For example if a computer fails, and has to be replaced by another on an emergency basis, any licensed software products whose license is tied to the computer serial number of the original computer will receive an out-of-compliance signal from the ECM if the user attempts to operate them on the replacement computer. Yet the licensee, and probably the vendor as well, might consider this a permitted use. As another example, if a particular employee, to whom a software product is tied by name, is replaced (perhaps, due to illness, only by a temporary worker), the new employee will not be able to use the software product, and therefore may not be able to perform his job duties.

User organizations are typically permitted by their license agreements to replace a computer or an employee with another. But until they formally notify the software vendor of the change, and receive a new license certificate reflecting that change, the ECM will continue interpreting the situation as out-of-compliance, causing (from the user's perspective) inappropriate hard-stops.

Acknowledging these concerns, some vendors do not use hard-stops in their products, relying instead on the strength of the provisions in their license agreements, and the hope that user organizations will not wish to violate the terms of a contract. Vendors may also, in their license agreements, require the right to periodically audit the activities of the licensee to ensure that license terms have been complied with. And some vendors, while continuing to use the services of an ECM for their products, do not employ a hard-stop in out-of-compliance instances, instead allowing the products to continue to operate after issuing a warning or alert that an out-of-compliance situation exists.

Other vendors might employ hard-stops in their products for some or all out-of-compliance conditions but allow users to freely create or modify certificates. This approach, called "customer managed licensing", gives users the unilateral ability to define certificates embodying additional rights, perhaps any rights they choose, whether or not those rights are actually contained in the applicable license agreement. Thus, the user can always avoid the occurrence of a hard-stop by defining an appropriate certificate, even going beyond the conditions of their license if they feel this is proper or necessary. Some vendors feel that requiring the user to take an overt action such as defining additional rights in a certificate, which can be logged or otherwise captured by the ECM, makes it more difficult for a user to later claim that a product was improperly used "by accident".

But, in practice, all these protections, aside from a hard-stop, are rather weak. Users tend to be more lenient and forgiving of their own actions than a vendor would wish them to be. Vendors rarely invoke their right to conduct audits, as an audit is an expensive undertaking (for which the vendor would typically have to pay), and is intrusive, disruptive and therefore objectionable to the user organization, who is after all the vendor's client, with whom the vendor often hopes to do future business.

The warnings, modified certificates and other records of non-compliance, even if captured and logged by an LM, do not typically find their way back to the vendor, as this information is mixed together with information about other unrelated activities pertaining to products from other vendors, as well as information about the customer's computer system as a whole. Most customers would regard this as confidential and would not allow it to be released to a particular vendor. And in general, customers are leery of sending any information to vendors without carefully reviewing it beforehand and, at the very least, being aware of anything that might be controversial or wrongly construed by the vendor.

A typical mainframe computer might have 500 software products, licensed from dozens of vendors, and employing multiple license managers. As such, the generation, dissemination and transmittal of compliance information to each vendor can be burdensome, onerous and error-prone.

SUMMARY OF THE INVENTION

As used herein, the term "licensor" denotes the owner or the designated agents of a licensed property or the like. For example, the publisher of a licensed software product may designate several vendors to act as agents to distribute and collect licensing fees for the product.

Accordingly, it is an object of the present invention to provide a licensed property usage monitoring system which allows licensors to definitively determine (after the fact and without the use of hard-stops) whether their licensed properties have been used in compliance with license terms.

It is a further object of the invention to provide a system of the type which is not unduly burdensome on users to deploy and use.

It is yet another object of the invention to provide a system of the aforementioned type which allows users to precheck and verify the information that is being sent to licensors and which concerns the user's use of licensed property such as computer software, music, video and the like.

It is a further object of the invention to provide a system wherein the compliance information pertaining to multiple licensed products and multiple licensors is transmitted to one or more clearinghouses for subsequent collation, correlation and redistribution to the licensors of those products.

The foregoing and other objects of the invention are realized by a license compliance verification system (LCVS) that operates by interfacing with a user's general purpose license manager and which is able to extract from data gathered by the general purpose license manager, information which is specific to licensors and which is then authenticated to assure licensors that it has not been modified, deleted in part, or otherwise tampered with. The system of the invention uses a variety of expedients, including authentication and encryption technology to achieve its ends.

Other features and advantages of the present invention will become apparent from the following description of the invention which refers to the accompanying drawings.

DETAILED DESCRIPTION OF EMBODIMENTS OF THE INVENTION

The License Compliance Verification System (LCVS) of the present invention overcomes the above difficulties by providing a reliable means, acceptable and palatable to both customers and licensors, for requiring and facilitating the transmission of license compliance information, gathered by an XSLM-compliant LM (XSLM-LM), from customers to licensors. The LCVS allows licensors to definitively determine (after the fact and without the use of hard-stops) whether their licensed products have been used in compliance with the license terms—a "trust but verify" approach.

Figure 1:
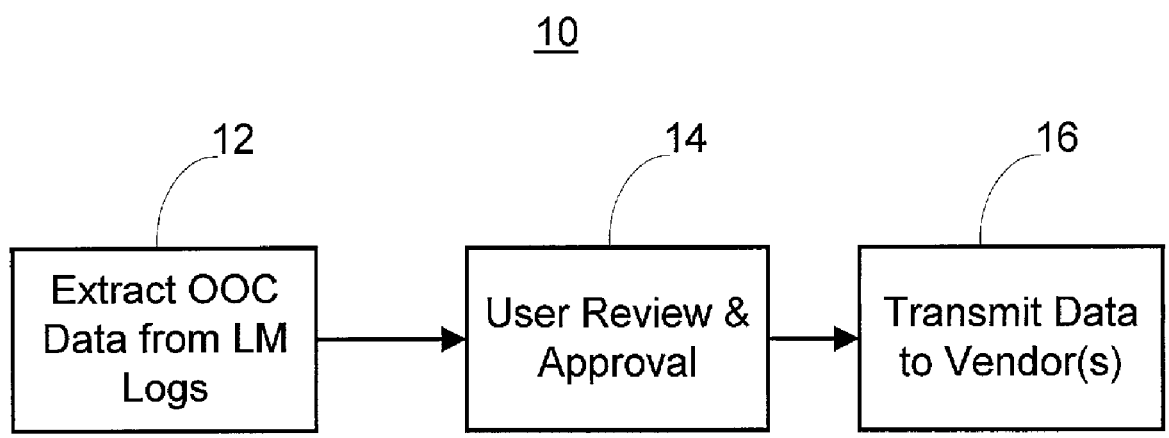
FIG. 1 is a block diagram of the basic process flow of the license compliance verification system of the present invention.

Referring to FIG. 1, the LCVS processes the product usage information that has been gathered by an XSLM-LM, including any OOC violations, and extracts from it, under user specification and control, the data applicable to a specified licensor, with all extraneous information removed. The LCVS then permits the user to review, but not modify, the extracted data before approving transmittal of the data to the respective licensors thus giving the user full advance knowledge of any overages or compliance issues that will be reported to the licensor.

With further reference to FIG. 1, the LVCS 10 comprises a first monitoring software component 12 which serves to extract out-of-compliance (OOC) data from the LM (License Manager) logs in accordance with instructions provided by the licensors. The information may contain information other than out-of-compliance data as well, for example, information defining the frequency of use of software, music and the like. A second component of the LCVS 10 comprises a user review and approval software 14 that allows a user of software to review information that will be transmitted by the LCVS 10 to licensors. The last component in FIG. 1 is a transmit data to licensors software component 16 which is instrumental in packaging and/or transmitting extracted information to licensors.

Optionally, the LCVS determines whether the data contains any instances of out-of-compliance conditions, and only requires user review if so desired, otherwise automatically transmitting the data without review. Optionally, LCVS may be configured to only transmit out-of-compliance data and certificate modification data; in this case, the entire transmission may consist of simply an indication that there are no data to be transferred.

Transmitted data, in addition to being encrypted to prevent it from being accessed by unauthorized parties, is marked in a way that provides authentication and assurance that it was produced by a trusted process, namely, the LCVS, and accurately reflects all relevant data gathered by the XSLM-LM. Optionally, instead of transmitting the data directly to the licensor, the licensor is permitted to directly access the data residing on the user's computer from the licensor's remote location, or, as a variant, to employ a software agent operating on behalf of the licensor but active on the user's computer.

The LCVS operates on an as-needed basis, whenever the user wishes, and for whichever product(s) or licensor(s) desired. Or it can be more fully automated, allowing the user to specify the calendar schedule of when it should be run and, for each instance, the product(s) or licensor(s) which should be processed.

The LCVS operates as follows (other, similar, schemes may optionally be used):

1. Each time the LCVS is initiated, the user specifies the product(s) or licensor(s) that should be processed, and the time period that should be covered, which can be a specified period, such as the preceding calendar month, or prior 30 days, or the period since the LCVS last gathered data pertaining to the same product(s) and licensor(s). Optionally, the user may specify that the resultant extracted data, after review, should be automatically transmitted by the LCVS to the appropriate licensor(s).

2. Optionally, using an Administrative Interface to the LCVS, the user establishes a schedule for the LCVS to automatically initiate. All the information normally supplied to the LCVS when it is initiated, as described in the preceding step, may instead be supplied as part of this scheduling process.

3. When the LCVS is initiated in a particular instance, it determines the time period for which data should be extracted, and the product(s) and/or licensor(s) that the data should apply to.

4. The LCVS then extracts from the XSLM-LM all usage data, non-compliance data, and changed-certificate data for the specified products/licensors for the time period. Depending on the XSLM-LM and the facilities that it makes available, the data may be extracted by reading a sequential log, filtering out and discarding all irrelevant data, or it may be extracted using direct queries to the XSLM-LM (which may have retained the data on a database), obtaining only the desired information.

5. The data is presented to the user for review. Optionally, this step is skipped if the LCVS determines that the data contains no exception conditions. Optionally, if no data is to be transmitted, a special data block is created to indicate this. Alternatively, this step may take place after the data has been encrypted and placed on the shipping media, so that the customer can ensure that what he sees is really what is being sent.

Figure 2:
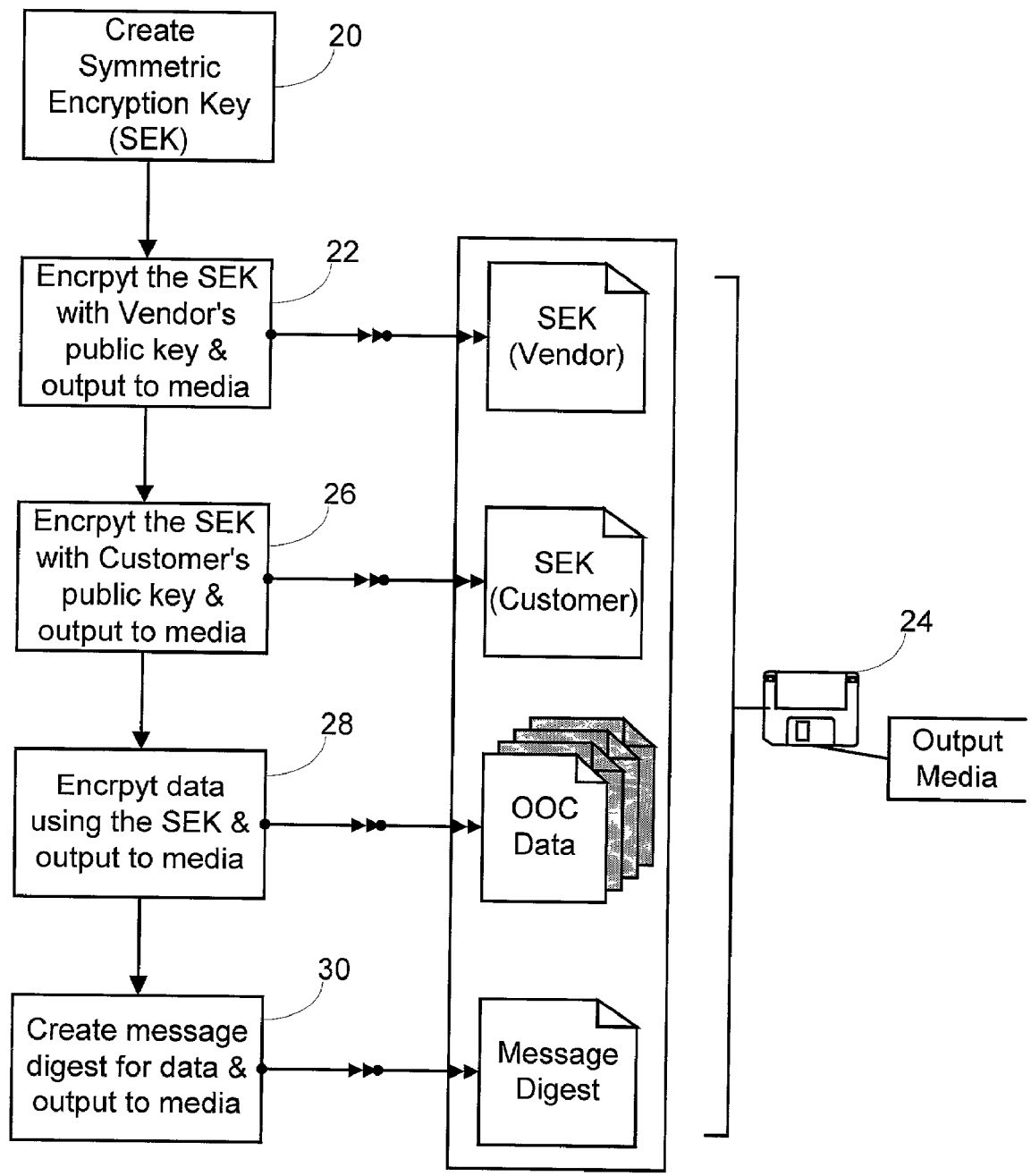
FIG. 2 is a flow chart of an encryption system associated with the present invention.

6. Referring to FIG. 2, a new symmetric-encryption key is dynamically created (step 20) for encrypting the data to be transferred.

7. Using Public Key Encryption techniques, the symmetric-encryption key is encrypted using the licensor's public key (step 22) and placed on the output media 24, thus making the symmetric-encryption key available to the licensor.

8. The symmetric-encryption key is also encrypted using the customer's public key (step 26) and placed on the output media 24, thus making the symmetric-encryption key available to the customer.

9. The data is encrypted (step 28) using the symmetric-encryption key and placed on the output media. Note that steps 6 through 9 employ a symmetric-encryption key for efficiency—alternatively, the data could simply be encoded using the licensor's public key, however this generally requires substantially greater computation and produces a situation wherein only the licensor can decrypt the data.

10. The data is digitally signed in order to "authenticate" the data as having been prepared by a trusted process, namely, the LCVS. This is done by creating a "message digest" (step 30), consisting of a hash value, or arithmetic total, computed from the encrypted data, which is then encrypted using a private key specific to (and embedded within) the LCVS, and placed on the output media.

11. Optionally, the data is tagged in such a way as to request or require that the licensor, after decrypting the data, re-encrypt the data using the user's public key, then send the data back to the user. This allows the user to compare the original data sent with the copy eventually returned in order to verify that the data was accurately encrypted for transmission to the licensor, and also properly received and decrypted.

12. Lastly, if not already performed, the data is copied to shippable media (tape, diskette, etc.) that the user can send to the licensor. Optionally, it is transmitted electronically by the LCVS directly to the licensor. Optionally, a reporting program prints the data in numerical format for transmittal to the licensor. The resulting data can be captured manually or using a document scanner and OCR techniques to reconstruct the encrypted data file.

As an alternative to steps 6 through 12, the data is formatted by a reporting program and printed on paper for transmittal to the licensor. Optionally, steganographic techniques are used to include identifying "watermarks" that authenticate the document.

The purpose of the dual-encryption of the symmetric-encryption key is to allow the customer and the licensor to independently decrypt the data. The purpose of the message digest, encrypted via a publisher-private key, is to assure the publisher that the data hasn't been modified after it was extracted from the XSLM-LM.

Optionally, the LCVS provides the customer with a record, hardcopy or electronic, of the OOC report sent to each licensor.

Optionally, the LCVS provides the customer with a receipt acknowledging that the OOC report was prepared and sent to each licensor.

In another embodiment, the LVCS component 12 accumulates the product compliance data pertaining to multiple licensors. This data is copied to storage media for shipment or electronic transmittal to a central clearinghouse for such information. The clearinghouse accepts this information from multiple users, consolidating and sorting it according to licensor so that the information about all the licensed products for a particular licensor can be periodically (or as it develops) sent to that licensor, automatically, or in response to prompting by the licensor. Aspects of the clearinghouse are described in U.S. Pat. No. 6,029,145, the contents of which are incorporated by reference herein.

The present invention is equally applicable to non-XSLM-compliant LMs such as LicensePower/iFOR, LUM, FLEXlm or Sentinel/LM.

The present invention is equally applicable to notify rights-holders of compliance conditions for other licensed products such as copyrighted music, books, photos, movies, videos, etc. where, for example, a license agreement may stipulate that certain royalties are to be paid according to sales volume or according to revenue, or the rights conveyed may include restrictions such as a period of time.

The present invention is also equally applicable to other licensed properties such as trade secrets where the rights-holders may deem it essential to quickly and accurately determine the compliance conditions. For example, a non-disclosure agreement may impose restrictions as to who may view certain documents and during what period of time.

It is becoming common for many Internet websites to sell or distribute copyrighted material belonging to others. For example, many sites distribute music in the form of MP3 files; other sites enable users to download e-books; still others distribute copyrighted works of art; and movies and video will be distributed in this fashion as soon as bandwidth and storage capacity increase sufficiently. Many organizations use automated systems to record the number of units manufactured and shipped.

In this embodiment, an ECM, operating on the computer system of the distributor, may only count the number of each item sold or manufactured and, optionally, keep a tally of the gross revenue; or the ECM is a program which periodically "audits" the sales and other records of the licensee to produce a record of the appropriate compliance data.

For the licensor, having compliance data as simple as the number of units sold or sales volume can provide an easy means of determining that the royalties paid are correct.

But the rights to use the copyrighted works that are conferred on the licensee may be based on the type, frequency and extent of their usage of the work. For example, a piece of music might be licensed on a fee-peruse basis, or for a fixed fee permitting up to a certain total number of plays, or a certain number per stated time period, or only on particular stated playback equipment. If usage and compliance were administered by an LM, the LCVS would ensure that the licensor receives complete information about that usage and compliance.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A license compliance verification system, comprising:
   a license manager that internally monitors use of licensed property comprising a plurality of respective licensed products and intended to be used by licensed users, and gathers data on the usage of the respective licensed products, including by reference to a plurality of respective licensors of the respective licensed products; and
   monitoring software that interfaces with the license manager and extracts from it licensor-specific data and authenticates the retrieved data such that the respective licensors are assured, based on a set of license-specific rules, that data gathered by the license manager has not been altered or improperly deleted prior to its being provided to the respective licensors.

2. The license compliance verification system of claim 1, in which the licensed property comprises computer software.

3. The license compliance verification system of claim 1, in which the monitoring software includes a facility that enables users to review data before it is sent to the respective licensors and prevents users from modifying such data.

4. The license compliance verification system of claim 1, in which the license manager includes a facility that accepts passwords and license certificates for authorizing usage of at least one of the respective products.

5. The license compliance verification system of claim 1, in which the gathered data comprises out-of-compliance data.

6. The license compliance verification system of claim 1, in which the gathered data comprises license certificate modification data.

7. The license compliance verification system of claim 1, in which the monitoring software includes a facility that enables the respective licensors to directly and remotely provide instructions to the monitoring software.

8. The license compliance verification system of claim 1, in which direct access to the monitoring software is granted to an agent operating on behalf of at least one of the respective licensors but which is active on a user's computer.

9. The license compliance verification system of claim 1, further including an operator control facility that enables controlling the monitoring software to carry out a data gathering task based on selection criteria and the selection criteria includes at least identification of the licensed products or the respective licensors.

10. The license compliance verification system of claim 1, in which the monitoring software is operable on a time scheduling basis.

11. The license compliance verification system of claim 1, further including a facility for creating a new symmetric encryption key for encrypting the data to be transferred to the respective licensors.

12. The license compliance verification system of claim 11, including a facility that encrypts the symmetric encryption key using a public key of at least one of the respective licensor.

13. The license compliance verification system of claim 11, including a facility that encrypts the symmetric encryption key using a public key of a user.

14. The license compliance verification system of claim 1, further including an authenticating facility which is operable as a part of the monitoring software and which authenticates data that is gathered for at least one of the a respective licensors to prevent tampering with such data.

15. The license compliance verification system of claim 14, in which the authentication comprises a message digest and the message digest is a data digest selected from the group consisting of a hash value or an arithmetic total computed from encrypted data which is then encrypted using a private key specific to the monitoring software.

16. The license compliance verification system of claim 1, in which the licensed property is selected from a property group consisting of: licensed software, trade secrets, copyrighted music, copyrighted books, copyrighted photos, copyrighted movies, and copyrighted videos.

17. A method for verifying compliance with license conditions, the method comprising the steps of:
   operating a license manager so as to internally monitor use of licensed property comprising a plurality of respective licensed products, intended to be used by licensed users, and gathering data on the usage of the respective licensed products including by reference to respective licensors of the respective licensed products;

extracting, from data logged by the license manager, licensor-specific data; and authenticating at least portions of the retrieved data based on licensor-specific rules in preparation for forwarding the retrieved data to one or more of the respective licensors, so as to assure that data gathered by the license manager has not been altered or improperly deleted prior to its being provided to the respective licensors.

18. The method of claim 17, in which licensed property comprises computer software.

19. The method of claim 17, further including enabling users to review data before it is sent to the respective licensors and preventing users from improperly modifying such data.

20. The method of claim 17, including operating the license manager to accept passwords and license certificates for authorizing usage of at least one of the respective licensed products.

21. The method of claim 17, including retrieving from the license manager out-of-compliance data.

22. The method of claim 17, in which the gathered data comprises license certificate modification data.

23. The method of claim 17, including enabling the respective licensors to directly and remotely provide instructions which affect the retrieving of data from the license manager.

24. The method of claim 23, further including operating an agent on behalf of at least one the respective licensors which is active on a user's computer.

25. The method of claim 17, further including controlling the retrieving of data from the license manager based on selection criteria that select information at least on a basis of identifying the respective licensors or the respective licensed products.

26. The method of claim 17, further including retrieving data from the license manager by reference to time periods over which such data has been initially collected.

27. The method of claim 17, further including creating a new symmetric encryption key for encrypting the data to be transferred to the respective licensors.

28. The method of claim 27, including encrypting the symmetric encryption key using the public key of at least one the respective licensors.

29. The method of claim 27, including encrypting the symmetric encryption key using the public key of a user.

30. The method of claim 17, further including authenticating retrieved data.

31. The method of claim 30, including employing an authentication process which comprises including a message digest, said message digest being a data digest selected from a group consisting of a hash value or an arithmetic total computed from the encrypted data which is encrypted using a private key.

32. The method of claim 17, in which the licensed property is selected from a property group consisting of: licensed software, trade secrets, copyrighted music, copyrighted books, copyrighted photos, copyrighted movies and copyrighted videos.

33. The method of claim 28, further including encrypting the symmetric encryption key which has been encrypted using the public key of at least one of the respective licensors, with a user's public key and subsequently providing such twice encrypted information to a respective user.

34. The license compliance verification system of claim 12, including a facility that encrypts the symmetric encryption key, which has been encrypted using the public key of at least one of the respective licensors, with a user's public key and subsequently providing such twice encrypted information to a respective user.

35. The license compliance verification system of claim 1, further including a central clearinghouse facility, the monitoring software accumulating licensor-specific data pertaining to a plurality of licensors and transmitting the same to the central clearinghouse facility, the clearinghouse facility consolidating, sorting and providing the licensor-specific data according to the respective licensors.

36. The license compliance verification system of claim 35, in which the monitoring software and the central clearinghouse facility interact with each other automatically.

37. The license compliance verification system of claim 35, in which the monitoring software and the central clearinghouse facility interact with each other in response to prompting by specific ones of the respective licensors.

38. The method of claim 17, further including accumulating the licensor-specific data relative to a plurality of the respective licensors and transmitting the same to a central clearinghouse facility, the central clearinghouse facility consolidating, sorting and providing the licensor-specific data according to the respective licensors.

39. The method of claim 38, including transmitting the licensor-specific data to the central clearinghouse facility automatically.

40. The method of claim 38, including transmitting the licensor-specific data to the central clearinghouse facility in response to prompting by specific ones of the respective licensors.

* * * * *